6691X
W. Carlock.
Neck-Tie.
No
Fig. 1. Patented Aug. 9. 1831.
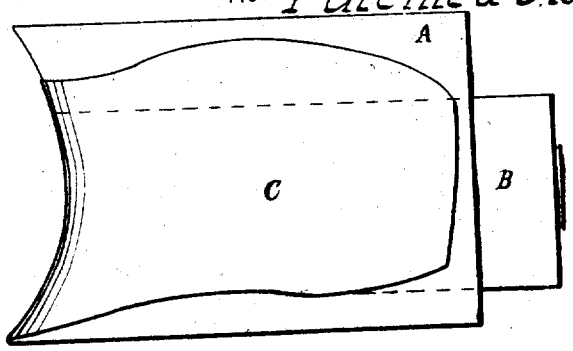
Fig. 2.
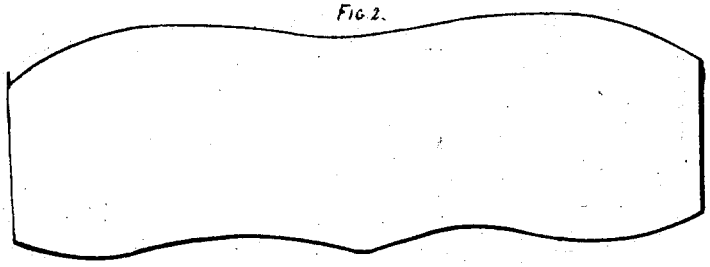
Fig. 3.
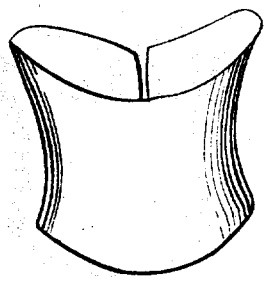
Fig. 4.
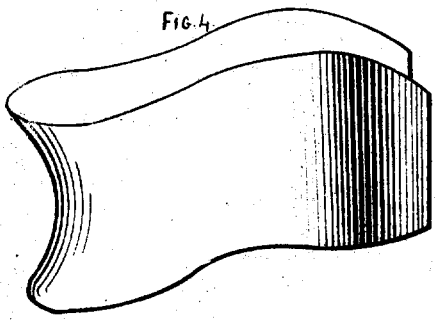

6691x William Carlock Aug. 9. 1831 114

Letters Patent

The Schedule referred to in these Letters Patent and making part of the same containing a description in the words of the said William Carlock himself of his improvement in the Stock.

To form the Stock make use of hair cloth, composed either of cotton warp and hair filling, or silk warp with filling of hair and cotton alternately. Prepare the hair [illegible] by an application of starch, Rye flour or other suitable sizing, next cut the Stock Longitudinally out of the piece so as to keep its length at right angles to the hair filling. Adapt it in size and shape to the neck, then place it properly damped on a heated mould or cylinder. By this process a suitable curve is obtained and the Stock shaped to fit the neck. Let the Stocks remain on the mould until dry which is effected in a few minutes. By varying the moulds Stocks may be reduced to any required form and shape. After removal from the moulds the silk hair cloth may be trimmed for immediate use without covering. The cotton Hair cloth may be finished by covering it with silk velvet japanning or other proper material.

The peculiar advantages of this improvement and its difference from other Stocks consist in its simplicity of structure; it being of one entire piece without a seam. In the application of heat to mould each Stock into shape, thereby combining ease and elasticity with permanency and strength, and in the preparation of hair cloth by japanning. As in case the silk warp is used, in the cheapness and facility with which a light and pleasant Stock is formed without the necessity of covering. The whole process is simple expeditious and in all respects superior to to any heretofore in use. On account of its advantages therefore I claim a Patent for the improvement and the exclusive privilege of making using and vending the same.

Witnesses { George Arrowsmith, R. S. Fenner } William Carlock

[illegible]

D[illegible]